June 29, 1937.　　D. J. CAMPBELL　　2,085,294
VEHICLE WHEEL
Filed Jan. 14, 1935　　3 Sheets-Sheet 1
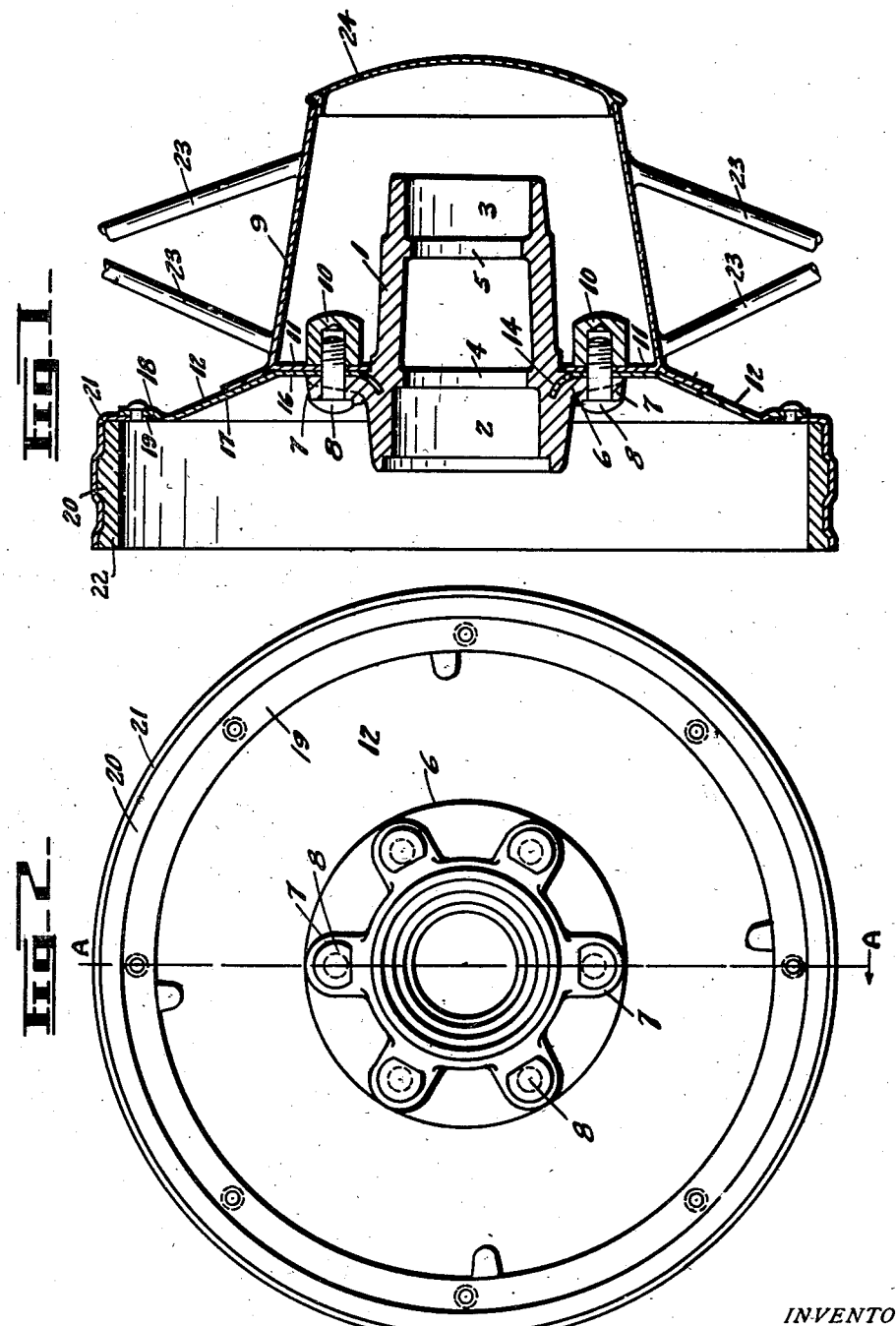
INVENTOR
DONALD J. CAMPBELL
BY Charles W. Dake
ATTORNEY

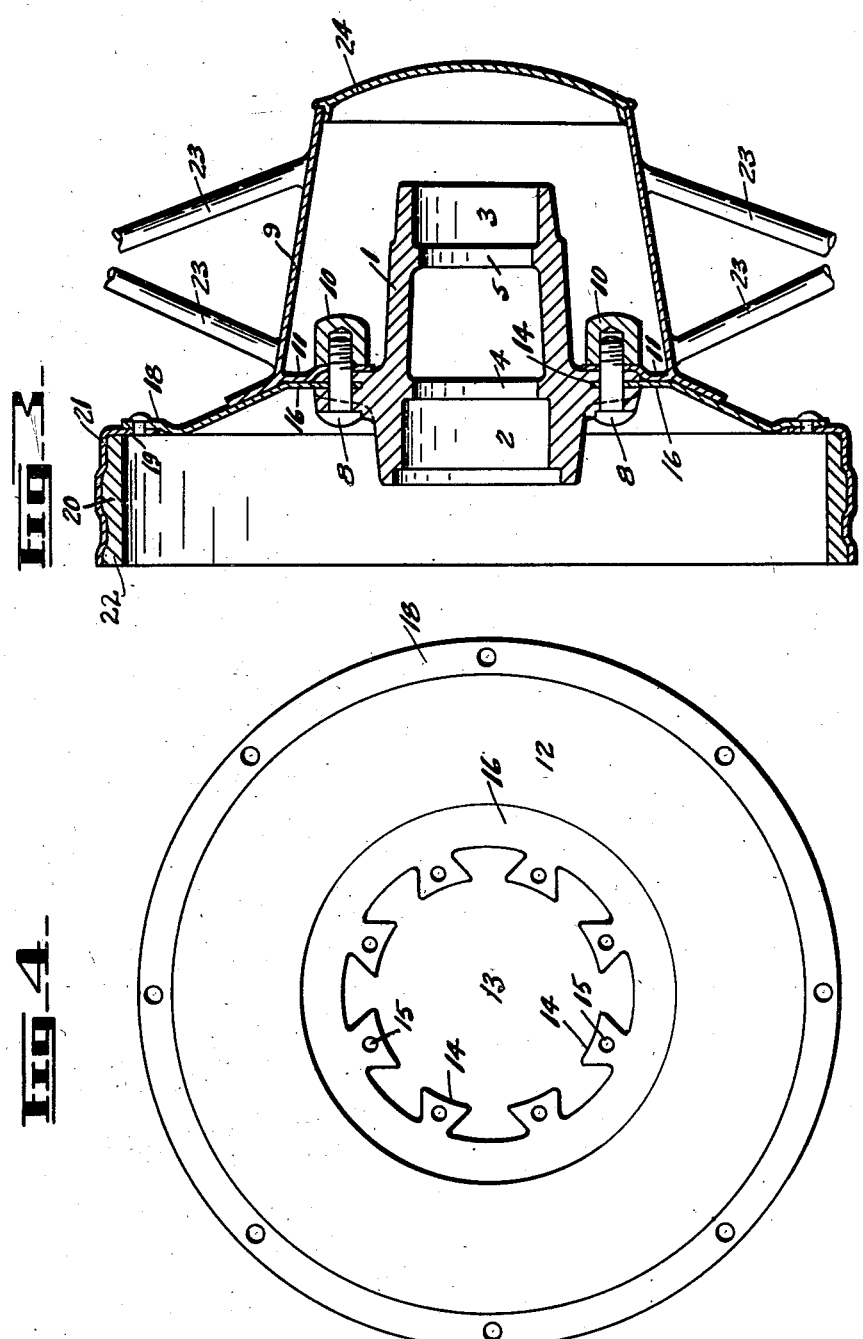

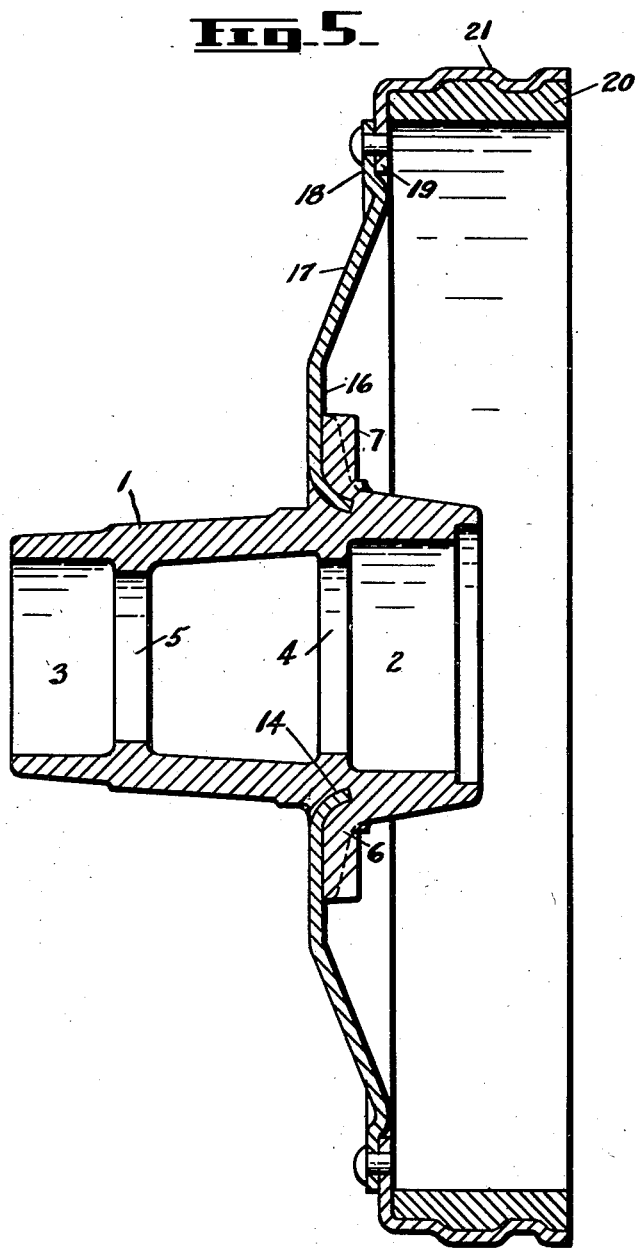

Patented June 29, 1937

2,085,294

UNITED STATES PATENT OFFICE 2,085,294

VEHICLE WHEEL

Donald J. Campbell, Spring Lake, Mich., assignor to Campbell, Wyant & Cannon Foundry Company, Muskegon Heights, Mich., a corporation of Michigan Application January 14, 1935, Serial No. 1,733

4 Claims. (Cl. 301—6)

This invention relates to vehicle wheels and more particularly to a method whereby the braking band supporting back is attached to the cast metal hub of the wheel. The objects of invention are, to produce a vehicle wheel whereof the attachment of the braking band will be more secured than heretofore, more cheaply made and not liable to become disarranged. An understanding of the invention whereby the attainment of the objects stated is secured, as well as others not enumerated, may be had from the following description taken in connection with the drawings, in which:

Fig. 1 is a sectional view taken on line A—A of Figure 2.

Fig. 2 is a view looking at the wheel as from the left of Figure 1, showing the braking band, its wrought metal supporting back, cast metal hub and bolts whereby the wheel spoke and rim portion are secured to the hub.

Fig. 3 is a sectional view of a modified construction of attaching the braking band supporting back to the hub.

Fig. 4 is an illustrative view of the wrought metal supporting back, and

Fig. 5 is an enlarged fragmentary view of the wheel hub, braking band and supporting back.

Throughout the several views of the drawings, similar characters of reference refer to like parts.

The hub 1 made of cast metal and at its interior has the usual machined cups 2 and 3 for receiving ball bearings on which the wheel revolves. 4 and 5 are shoulders which prevent the ball bearing outer raceways from longitudinal displacement. Exterior of the hub is a spoke and rim supporting flange 6 having bolting lugs 7 through which bolts 8 pass to secure the spoke and rim portion of the wheel 9 to the flange 6 of the hub by the nuts 10; clamped between the flange portion 11 of the spoke and rim portion 9 and the flange 6, the wrought metal braking band supporting back 12 is clamped. The braking band supporting back has at substantially its central axis an irregular hole or opening 13 into which extend dove-tail like projections 14. Integral with the supporting back, each of the dove-tail projections is provided with a hole 15 extending through them for the purpose later described. The dove-tail projections and a portion of the supporting back surrounding them are bent or shaped preferably to the form shown in Figure 1, and for a distance surrounding the bent portion, the supporting back is flat as shown at 16, from which it is disked as 17 and again it is flat as at 18 where it is secured to the flange 19 of the braking band 20, by riveting the braking band, consists of a wrought metal shell 21 and centrifugally cast in ferrous metal braking member 22. 23 represents wire spokes of the wheel and 24 a dust cap for preventing dust and dirt from entering the hub.

In the production of the present invention a mold is made of the hub from a suitable pattern having the form desired. The braking band supporting back of wrought metal, preferably steel, having been produced substantially as shown, is placed in the mold and molten metal of high temperature such as molten steel is poured into the mold surrounding the dove-tail like portion of the supporting back and through the holes in the dove-tails; therefore, upon solidifying and cooling, the hub is securely attached to the dove-tails and thus to the supporting back or vice versa. With the employment of molten steel at its normal casting temperature around 2900 degrees Fahrenheit, the supporting back will be secured to the hub portion by an interlock with the dove-tails and the pin portion passing through the holes of the dove-tails; and with the employment of the molten metal poured into the hub mold against the supporting back at 3000 or more degrees Fahrenheit, the metal of the hub portion and the dove-tail like portions of the supporting back will be fused or welded together and be substantially as strong as if they were of one, with the advantage of a thin section wrought metal supporting back for lightness and a readily machinable cast metal hub.

In addition to securing the wrought metal back to the cast metal hub by casting the hub onto the dove-tail like projections, the flat portion immediately surrounding the dove-tail like portion of the supporting back is clamped between the face of the flange on the hub and flange of the spoke and rim portion by a plurality of bolts passing through the flange on the hub and through the flat portion of the supporting back.

The invention is not to be understood as restricted to the details set forth, since these may be modified within the scope of the appended claims, without departing from the spirit and scope of the invention, and Having described the invention, what is claimed as new and desired to secure by Letters Patent, is:

1. A vehicle wheel structure comprising as a portion of its elements a braking band consisting of an annular cast metal braking member and a wrought metal shell surrounding the periphery of said braking band and having at one of its sides an inwardly extending flange, a supporting back secured to said inwardly extending flange, the said supporting back provided with an axial opening having inwardly extending bent projections and a hub cast through said opening and onto said projections.

2. A vehicle wheel structure comprising as a portion of its elements, a braking band consisting of an annular braking band of cast metal and a wrought metal shell having at one of its sides an inwardly extending flange, a supporting back for said braking band secured to said inwardly extending flange at its periphery, the said supporting back having an axial opening provided with a plurality of inwardly extending projections and a hub cast onto said inwardly extending portions.

3. A vehicle wheel structure comprising as a portion of its elements, a braking band consisting of an annular braking band of cast metal and a wrought metal shell having at one of its sides an inwardly extending flange, a supporting back for said braking band riveted to said inwardly extending flange at its periphery, the said supporting back having an axial opening provided with a plurality of inwardly extending projections and a hub cast onto said inwardly extending portions.

4. A vehicle wheel structure comprising as a portion of its elements, a braking band consisting of a braking band cast into a wrought metal shell having at one of its sides an inwardly extending flange, a supporting back for said braking band secured to said inwardly extending flange and having an opening at its axis and a hub cast onto the supporting back around said opening.

DONALD J. CAMPBELL.